United States Patent Office 3,096,381
Patented July 2, 1963

3,096,381
MANUFACTURE OF DIARYLETHANES
Erhard J. Prill, Dayton, Ohio, assignor to Monsanto Chemical Company, St. Louis, Mo., a corporation of Delaware
No Drawing. Filed Aug. 30, 1956, Ser. No. 606,966
11 Claims. (Cl. 260—668)

This invention relates to the manufacture of diarylethanes. The invention further relates to the process of producing unsymmetrical diarylethanes. More particularly, this invention relates to the production of 1,1-diarylethanes wherein acetylene is reacted with a mono- or di-alkyl substituted benzene. This application is a continuation-in-part of my copending application Serial No. 337,680 filed February 18, 1953, and now abandoned which pertains in certain preferred aspects to the manufacture of 1,1-diarylethanes by condensation of aromatic hydrocarbons with acetylene in the presence of comparatively large volumes of a liquid sulfuric acid-mercuric sulfate catalyst.

It has been known for some time that acetylene can be condensed with aromatic hydrocarbons to form 1,1-diarylethanes in the presence of concentrated sulfuric acid containing mercuric sulfate. However, satisfactory yields have not been obtained. Thus, Reichert and Niewland (Organic Syntheses IV, 23–5 (1925)) describe the reaction of acetylene with toluene wherein a yield of 60 to 64 percent of the theoretical amount of 1,1-di-tolylethane is obtained. The reaction was effected with 700 cc. (6.6 moles) toluene and 70 cc. concentrated sulfuric acid containing 7 grams mercuric sulfate, at a temperature of 10 to 15° C. A total of 2.3 moles of acetylene was introduced over a period of 2 hours. Further, 75 grams of a tarry residue was produced. The authors further indicate that with other aromatic hydrocarbons, yields are lower.

Inasmuch as diarylethanes can be pyrolyzed to produce vinyl aryl compounds, which of course have great interest as monomers in the plastics and rubber industries, it would be very desirable to have a truly efficient method of making diarylethanes from acetylene and aromatic hydrocarbons. But, as pointed out above, although the reaction has been known for a long time, it has not heretofore been known how to achieve same with near-theoretical yields.

Certain objects of my invention are to prepare 1,1-diarylethanes by the reaction of acetylene with a compound selected from the group consisting of mono- and di-alkyl substituted benzenes. A further object of my invention is the production of 1,1-diarylethanes wherein the yields obtained are greater than 75% theoretical based on the amount of acetylene and substituted benzenes reacted. Still another object of the present invention is to provide a process whereby reaction conditions employed are carefully controlled to obtain yields not heretofore possible by the reaction of acetylene with mono- and dialkyl substituted benzenes. These and other objects of my invention will be discussed more fully hereinbelow.

The production of diarylethanes is desired inasmuch as the compounds may be cracked to produce substituted styrenes. The polymers of such substituted styrenes, as methyl and dimethylstyrene, possess certain improved physical properties, e.g., high heat distortion, when compared to polystyrene. However, by the known processes of production of diarylethanes, the cost of operation of the processes has not allowed any significant commercialization of these compounds. As previously stated, the production of diarylethanes by the reaction of acetylene with compounds such as toluene and xylene has not given satisfactory yields. In another process, such as the reaction of paraldehyde with toluene or xylene in the presence of hydrogen fluoride, the use of the hydrogen fluoride involves recovery and recycling procedures which tend to detract from the commercial attractiveness of the process and also add to the cost of the process. The process of my invention, thus, gives satisfactory commercial yields and is not burdened with the unattractive features of the prior art.

In the process of my invention, acetylene is reacted with a compound selected from the group consisting of mono- and di-alkyl substituted benzenes in the presence of a sulfuric acid-mercuric sulfate catalyst. When the conversion of a mono- or di-alkyl substituted benzene with acetylene is carried out as disclosed in the prior art, the yield of the 1,1-diarylethane is only about 60% based on the acetylene charged into the reactor and upon the mono- or di-alkyl substituted benzene used up. The process, as carried out in the prior art, charged 70% or more of the stoichiometric amount of acetylene required to react with all of the mono- or di-alkyl substituted benzene into the reactor. I have found that when from about 15% to about 45% of the stoichiometric amount of acetylene theoretically required to react with all of the substituted benzene is charged into the reactor, yields greater than 75% are obtained based on the acetylene charged and the substituted benzene used up. It is desirable in carrying out the process that the amount of acetylene utilized be not greater than 45% of the stoichiometric amount required to react with all of the mono- or di-alkyl substituted benzene present. By limiting the stoichiometric amount of acetylene that is introduced into the reactor, yields in excess of 75% are obtained inasmuch as the reaction of the 1,1-diarylethane produced with acetylene and toluene or acetylene and itself to form triaryldiethanes and tetraryltriethanes, respectively, is minimized. Thus, by controlling the concentration of 1,1-diarylethane produced, I also reduce the tendency of the 1,1-diarylethanes to undergo the deleterious side reactions set forth. Accordingly, it will readily be seen that when the amount of acetylene introduced into the reaction vessel is carefully controlled, the yield of 1,1-diarylethane obtained is such that the undesirable side reactions are limited and therefore the yield is greater than 75% based on the acetylene charged and on the mono- or di-alkyl substituted benzene used up.

In accordance with my above-referred to copending application, the reaction in question can be carried out to produce diarylethanes in very high yields, calculated both on acetylene charged and on aromatic hydrocarbon consumed. It is further possible in accordance with the aforesaid copending application to obtain these results while using only a small fraction of the mercuric sulfate formerly believed necessary. The aforesaid application includes my discovery that the use of a comparatively large volume of the liquid sulfuric acid-mercuric sulfate catalyst, at least 0.3 volume catalyst per volume of aromatic hydrocarbon and preferably at least 0.4 volume per volume of aromatic hydrocarbon, results in yields of product far above those previously reported. This not only provides a process of practical economic importance from the viewpoint of effective utilization of acetylene and aromatic hydrocarbon charged to the process, but also contamination of the acid catalyst with by-products is greatly reduced.

Examples of mono- and di-alkyl substituted benzenes that may be utilized in the process of my invention are such as toluene, o-, p-, m-xylenes, ethylbenzene, and the like. It is also possible to react long-chain mono- and di-alkyl substituted benzenes in the process of my invention, the only limiting factor being the availability of the substituted benzenes. The catalyst employed in the process of my reaction is sulfuric acid containing mercuric sulfate, which is finely ground and dispersed therein. Sulfuric acid of concentrations of from about 85% to about 105% may be employed in the instant process. For example, concentrations such as from about 88% to about 98.5% can be utilized. The amount of sulfuric acid that is used in the process of my invention can vary over rather wide limits, for example, from about 1 part of sulfuric acid per part of substituted benzene charged to about 1 part of sulfuric acid to about 25 parts of substituted benzene charged. By way of further example, such concentrations as from about 1:12 to about 1:5 parts of sulfuric acid per part of substituted benzene can be employed. The amount of mercuric sulfate that is dispersed in the sulfuric acid catalyst may also vary over rather wide limits. The amount of mercuric sulfate utilized is calculated as parts of metallic mercury present per part of sulfuric acid. Thus, from about 1:2500 to about 1:150 parts of mercuric sulfate calculated as parts of metallic mercury per part of sulfuric acid may be utilized in the process. For example, concentrations such as about 1:1000 to 1:333 parts of mercuric sulfate calculated as parts of metallic mercury per part of sulfuric acid can be employed.

In carrying out the process of my invention, the desired amount of substituted benzene is placed in a suitable reaction vessel and cooled to about 5° C. below the desired reaction temperature, stirring of the substituted benzene begun, and the sulfuric acid and powdered metallic mercury salt catalyst added. The reaction may be carried out at a temperature from about −20° C. to about 70° C. Stirring of the mixture is maintained throughout the reaction to emulsify the acid and the hydrocarbons and to prevent catalyst deposition at the bottom of the reactor. The measured amount of acetylene is then introduced into the reactor over the period necessary to introduce the desired calculated amount. After the acetylene addition is complete, the stirring of the reaction mixture is discontinued, the reaction mixture is separated and the 1,1-diarylethane recovered therefrom. When the reaction is carried out at below 0° C., the reaction mixture is more difficult to work up and the separation of the acid layer from the desired product is slower. Therefore, it is preferred that a temperature range of from about 0° C. to 45° C. be employed in the process.

The catalyst comprises fairly concentrated sulfuric acid containing a small quantity of mercuric ion, preferably provided in the form of mercuric sulfate. Sulfuric acid of 85 to 95 percent strength (the balance being water) can be used. For toluene about 90 percent sulfuric acid will be optimum while with xylene 87 percent is preferred, both of these values being with respect to reaction carried out at 0° C. The reaction temperature preferably does not exceed 10° C., and may be below 0° C. say down to minus 20° C. and lower, although for economic reasons it is preferred to operate at 0° C. or slightly above. The strength of acid and reaction temperature are correlated, the higher concentrations of the acid being used at the lower temperatures and vice versa. Also, as indicated by the foregoing reference to toluene and xylene, the different aromatic hydrocarbons which can be utilized in the present invention vary in their reactivity and this should be taken into account in choosing a suitable strength of acid and reaction temperature. Those skilled in the art will be able, having had the benefit of the present disclosure, to select a suitable combination of conditions for any given situation.

Acording to my copending application Serial No. 337,680, the quantity of mercuric sulfate should be below 1 weight percent of the acid. While 0.75 weight percent is quite satisfactory, I have surprisingly found that much smaller quantities, for example, 0.1 to 0.2 weight percent, can be used with essentially the same results, thus reducing the cost of the process to an important extent since mercury salts are quite expensive. Mercuric ion can be provided by other mercuric compounds that have some solubility in the acid, in weights that will be equivalent to the above values when calculated as mercuric sulfate. Thus, instead of mercuric sulfate one can use mercuric oxide, mercuric phosphate, mercuric acetate, mercuric chloride, or even a mercurous compound in the presence of an added oxidizing agent such as ferric sulfate that will result in mercuric ions. Thus, I prefer to employ a small but effective quantity of mercuric ion, preferably not exceeding 0.2 weight percent based on the sulfuric acid when calculated as mercuric sulfate.

The reaction may be effected in a number of ways in various types of apparatus. Thus, liquid catalyst and liquid aromatic hydrocarbon can be intimately admixed by vigorous agitation in a closed reaction vessel while gaseous acetylene is gradually passed into the vessel at a rate limited principally by the cooling capacity of the system. Absorption of the acetylene by the reaction mixture is comparatively rapid and the desired low reaction temperature must be maintained by removal of the exothermic heat of reaction. Vigorous agitation and admixture of the total reaction mixture is required. The reaction is easily effected at atmospheric pressure, but higher pressures, particularly using acetylene diluted with inert gas, can be used if desired. Another suitable procedure is to pass catalyst and aromatic hydrocarbon rapidly through a reaction tube manufactured in a manner to produce turbulent flow effecting thorough dispersion of catalyst with hydrocarbon, acetylene being introduced at the start of the tube and preferably at a plurality of points along the path of flow. This permits a short reaction time inasmuch as the heat of reaction is easily removed by indirect heat exchange of cooling fluid with the outside of the tube. On introducing the acetylene at the start of the tube and at a number of points along the path of flow, the separate places of such introduction can be considered as stages of the reactor. In such a multi-stage reactor, the amount of acetylene introduced into each stage of the reactor is a fraction of the total amount reacted, and the number of fractions is equal to the number of stages in the multi-stage continuous reaction. The more closely the multi-stage reaction approaches a single-stage reaction, the larger are the fractions of added acetylene, i.e., in a several-stage continuous reaction the amount of acetylene introduced into each stage is a substantial part of the total amount reacted. Other suitable apparatus and procedures will readily occur to those skilled in the art.

It is desirable that in the final reaction mixture after the completion of the reaction, there still be a considerable excess of unreacted aromatic hydrocarbon. The mole ratio of aromatic hydrocarbon charged to total acetylene charged is at least 3:1, and 4:1 usually gives higher yields. Still higher ratios can be used, but beyond the range of 4–4.4:1 to 6:1 little improvement is obtained in overall yield and the removal of the additional unreacted hydrocarbon from the final reaction mixture is an added expense. It can be stated that generally a mole ratio of total aromatic hydrocarbon charged to total acetylene charged should be within the range of 3:1 to 8:1 or more, and will ordinarily be within the range of 4–4.4:1 to 6:1. As indicated herein, the acetylene should be introduced in a gradual manner by suitable means so that the instantaneous concentration of acetylene in the reaction mixture is quite low. The reaction time of course will depend greatly upon the rate of removal of heat of reaction from the system, but in a simple well-agitated batch reaction with good heat exchange a reaction time of 2 to 3 hours is ordinarily adequate.

While the useful amounts of acetylene will ordinarily be in the range of from about 15% to about 45 or 50% of the stoichiometric amount of acetylene theoretically required to react with the total aromatic hydrocarbon charged, any amounts up to about half of the said stoichiometric amount of acetylene can be used, as the use of amounts of acetylene less than 15% of the stoichiometric amount does not impair the yield of 1,1-ditolylethane, but merely results in unnecessary dilution of the reaction mixture with unreacted hydrocarbon; i.e., the limitation to more than about 15% of the stoichiometric amount of acetylene is not material to the efficiency of the process, but rather is desirable because of practical considerations.

The reaction is generally applicable to aromatic hydrocarbons. Preferably those containing a single benzene ring are used, although the reaction can also be applied to polycyclic aryl hydrocarbons, for example, naphthalene and alkylnaphthalenes. Benzene and mono- and polyalkylbenzenes, and particularly mono- and dialkylbenzenes are suitable reactants. By way of further specific examples, there can be mentioned toluene, xylene (either ortho-, para-, or meta-xylene or mixtures of same) ethylbenzene, mesitylene, cumene, diethylbenzene, diphenyl. Those skilled in the art will understand that aromatic hydrocarbons containing non-hydrocarbon groups which do not interfere with the reaction can be employed.

According to one aspect of the invention claimed in my copending application Serial No. 337,680, the volume of catalyst should be at least 0.3 volume per 1 volume of aromatic hydrocarbon charged. It is preferred that the ratio of liquid volume of catalyst to liquid volume of hydrocarbon be at least 0.4:1. While even larger volumes can be used, an increase above say 0.6:1 usually does not give sufficiently improved yields to be warranted. In some instances it may be advantageous to use as much as 1 volume of catalyst per volume of hydrocarbon.

The following examples demonstrate some of the advantages of my invention in its various aspects, particularly as compared with prior procedures, and provide information as to suitable proportions and reaction conditions for preferred embodiments of the invention. However, it will be understood that variations from the precise details described can be employed without departing from the invention.

*Example 1*

The formation of 1,1-ditolylethane by condensation of acetylene with toluene was effected in the following manner.

The reactor consisted of a 2-liter, 4-necked, flask fitted with an efficient stirrer, thermometer, gas inlet tube (above surface of liquid), and gas outlet tube connected to a gas flow indicator.

The reaction flask was charged with 800 grams of 90% sulfuric acid. Powdered mercuric sulfate (6.0 grams) was added. The mixture was cooled to 0° C. Toluene in the amount of 736 grams (8.0 moles) was added. Addition of gaseous acetylene to the rapidly agitated mixture was begun when the reactor temperature on further cooling reached minus 1° C.

The acetylene flow was adjusted to permit addition of approximately 2 moles acetylene in 3 hours. All of the acetylene was absorbed. The temperature of the reaction mixture was kept at approximately minus 2° C. by cooling with a Dry Ice-mixed solvent bath. Acetylene flow was terminated after 3 hours and stirring was continued for an additional 15 minutes. A total of 1.89 moles acetylene had been added. Crushed ice (400 grams) was added to the reaction mixture and the resulting aqueous acid and organic layers were separated from each other. The latter was washed once with water and once with an aqueous solution of sodium bicarbonate and sodium chloride.

The washed oil layer was fractionated under reduced pressure in an 18-inch Vigreux column. Materials recovered by distillation were 4.10 moles unreacted toluene, 1.62 moles 1,1-ditolylethane, and 34 grams residue boiling higher than 1,1-ditolylethane. The yield of 1,1-ditolylethane was 85.8 percent of theory based on toluene consumed.

*Example 2*

In the apparatus and by the procedure described in Example 1, acetylene was condensed with toluene at essentially the same conditions of Example 1 with the exception that the quantity of mercuric sulfate employed was 1.0 gram instead of 6.0 grams as in Example 1. Ninety percent sulfuric acid in the amount of 800 grams, 8.0 moles toluene, and 2.0 moles acetylene were contacted at 0° C., by the method described, the acetylene addition time being 3.3 hours.

Unreacted toluene in the amount of 4.09 moles was recovered. The residue higher boiling than 1,1-ditolylethane was 30 grams.

1,1-ditolylethane was recovered in the amount of 1.66 moles, which is a yield of 82.8 percent based on acetylene and 84.8 percent based on toluene consumed.

This example demonstrates that high yields are obtainable even with an extremely small amount of mercuric sulfate. However, the reaction cannot be accomplished at all in the absence of any mercuric sulfate.

*Example 3*

Example 1 was essentially duplicated, with the exception that the reaction temperature was minus 10° C. The same amounts of 90 percent sulfuric acid, mercuric sulfate and toluene were used as in Example 1, and 1.96 moles of acetylene was added in a total period of 3 hours.

Unreacted toluene in the amount of 4.32 moles was recovered and the high boiling residue was 32 grams. 1,1-ditolylethane was recovered in the amount of 1.62 moles, which is a yield of 82.7 percent of theory based on acetylene and 88.3 percent based on toluene consumed.

This example demonstrates that sulfonation of toluene is less at the lower reaction temperature. It will be noted however that the yield based on acetylene was somewhat decreased from that obtained at minus 2° C. in Example 1.

*Example 4*

In apparatus and with procedures the same as those described in Example 1, the same reaction was effected by employing a relatively small quantity of sulfuric acid. In this example 130 grams of 95 percent sulfuric acid containing 6.0 grams mercuric sulfate was employed as catalyst at a temperature of minus 1° C. The amount of toluene used was 6.6 moles. Over a total period of 3 hours, 2.27 moles of acetylene was added.

Recovery of unreacted toluene was 2.87 moles and residue higher boiling than 1,1-ditolylethane was 94 grams. The 1,1-ditolylethane product was 1.41 moles, which is a yield of 62.2 percent of theory based on acetylene and 75.5 percent of theory based on toluene consumed.

By comparison with Examples 1, 2, and 3 it will be seen that a very poor yield of 1,1-ditolylethane was obtained, whether the basis is considered as acetylene or as toluene consumed. Furthermore, a large quantity of high boiling residue was produced.

*Example 5*

A run similar to Example 4 was made but with the higher toluene:acetylene ratio of Examples 1, 2, and 3 which should provide increased yields and with 90 percent sulfuric acid as in Examples 1, 2, and 3. However, a somewhat smaller amount of sulfuric acid was used, i.e., 105 grams in this example as compared with 130 grams in Example 4 and 800 grams in Examples 1, 2, and 3. The sulfuric acid contained 6.0 grams mercuric sulfate. In a total time of 4 hours, 2.0 moles of acetylene was added to 8.0 moles toluene at minus 2° C. The unreacted toluene recovered was 4.95 moles. Residue higher boiling than 1,1-ditolylethane was 89 grams. 1,1-ditolylethane product was 1.05 moles, which is a yield of 52.3 percent of theory based on acetylene and 68.9 percent of theory based on toluene consumed.

It will be observed that here, as in Example 4, large amounts of high boiling materials were produced and low yields of 1,1-ditolylethane were realized because of the small quantity of acid catalyst.

Example 6

In this example, meta-xylene was condensed with acetylene to form 1,1-dixylylethane. Apparatus and procedures were the same as described in Example 1. Meta-xylene in the amount of 8.0 moles (96.4 percent meta isomer) was charged to the reaction vessel. The catalyst was 87 percent sulfuric acid in the amount of 800 grams containing 6.0 grams mercuric sulfate. Reaction temperature was 0° C. Over a total period of 3 hours 1.94 moles acetylene was added. Unreacted xylene was recovered in the amount of 4.26 moles and the residue higher boiling than 1,1-dixylylethane was 34 grams. The product 1,1-dixylylethane was recovered in the amount of 1.66 moles, which is a yield of 85.2 percent of theory based on acetylene and 88.5 percent of theory based on xylene consumed.

Example 7

Example 6 was essentially duplicated with the exception that 90 percent sulfuric acid in the place of 87 percent sulfuric acid was used. The yield of 1,1-dixylylethane was 83.2 percent of theory based on acetylene and 73.8 percent of theory based on meta-xylene consumed. A considerable amount of meta-xylene-sulfonic acid crystallized from the diluted aqueous layer. This, and the considerably lower yield based on xylene consumed, shows the sulfonation effect of the stronger sulfuric acid.

Example 8

Example 6 was duplicated using the same strength (87 percent) sulfuric acid but a reaction temperature of 10° C. Acetylene addition was limited to 1.27 moles over a 4-hour period, which should be conducive to higher yields. However, pot residue was higher (48 grams) and the yield of 1,1-dixylylethane was 66.6 percent based on acetylene and 68.2 percent based on xylene consumed. Further, meta-xylene-sulfonic acid crystallized from the diluted aqueous layer.

It will be seen that with meta-xylene (which is considerably more reactive than toluene), a temperature of 10° C. is too high for best results when using 87 percent sulfuric acid.

Example 9

With 90 percent sulfuric acid at 0° C. and the procedures and conditions otherwise being essentially those described in Examples 6 and 7, high yields of 1,1-dixylylethane were obtained using xylene mixtures containing varying proportions of the ortho-, meta- and para-isomers. By analysis of recovered unreacted xylene it was possible to determine the percentages of each isomer that reacted. In each instance it was found that, taking the reactivity of meta-xylene as 1.0, the reactivity of para-xylene was approximately 0.4 and the reactivity of ortho-xylene was approximately 0.6.

Example 10

In a ditolylethane batch procedure, 736 grams (8 moles) of toluene, 800 grams 90% sulfuric acid, and 6 grams mercuric sulfate were charged. Acetylene was passed into the mixture at a temperature of −7 to −2° C. over a 3-hour period. The added acetylene amounted to 37 grams as measured by loss of weight of the acetylene cylinder, and to 31.5 grams as determined by gain in weight of the reaction flask; it is apparent that there was some leakage. The acetylene absorbed in the reaction flask was 30.2% of the stoichiometric amount theoretically required to react with all the toluene. The 231.5 grams of 1,1-ditolylethane product was 90.8% of theory based on the acetylene absorbed. This procedure indicates that the use of a high toluene to acetylene ratio results in an improved yield.

Example 11

In a ditolylethane batch procedure, toluene in the presence of mercuric sulfate and a relatively large amount of 90% sulfuric acid was reacted at −5 to −2° C. with about 43.4% of the theoretically required amount of acetylene. The yield of 1,1-ditolylethane was 76.2% based on toluene used up. The ditolylethane cut was taken at 138–142° at 5 mm. Hg and the collected distillate was of refractive index, $n_D^{25}=1.5628$.

Example 12

Toluene, 8 moles, in the presence of 800 grams of 87% sulfuric acid and 6 grams mercuric sulfate was reacted over a 3.25 hour period with 32.5 grams (1.25 moles) of acetylene at a temperature of about 10° C. This reaction utilizing about 31% of the theoretically required acetylene produced 211.0 grams of 1,1-ditolylethane, for a yield of 80.5% based on acetylene, and 94% based on toluene used up. This example again demonstrates the desirability of high toluene to acetylene ratios.

Example 13

A reactor was set up for conducting continuous reactions between substituted benzenes and acetylene to produce diarylethanes. The reactor was a two liter flask, with an inlet for charging the substituted benzene, and an inlet tube for charging acetylene below the surface of reaction mixture in the flask. The acetylene inlet tube was equipped with a rotameter, and a meter for measuring the flow of acetylene. An outlet at the side of the reaction flask was connected to a gravity separator which was designed so as to permit organic materials to be discharged by flowing from the upper part of said separator when a sufficient level was reached, while the heavier sulfuric acid catalyst was recirculated to the reaction flask through a tube leading from the lower part of the separator to the bottom of the reaction flask. The reactor was also equipped with a stirrer, temperature and pressure gauges, and a meter for measuring the flow of off-gases. An ice bath was provided for cooling the reactor.

To the reactor, 1050 grams of toluene, 1070 grams of sulfuric acid, and 8.3 grams of mercuric sulfate were charged. Additional toluene was charged continuously to the reactor for a number of hours, while a number of samples were obtained from the reactor discharge. Due to a leak in the acetylene line, no acetylene was charged during this time. Then, with about 900 grams toluene in the reactor (initial charge), the acetylene addition was commenced. During a one-hour period, 238 grams of toluene and 0.565 cu. ft. of acetylene (0.637 gram mole) were continuously charged, and a 173.8 gram sample of the organic phase was obtained by discharge from the reactor. The 0.637 gram mole of acetylene, about 10.3% of the amount theoretically required to react with the toluene charged [(900+238) grams], reacted completely as indicated by the lack of off-gases from the reactor.

Example 14

Upon continuing the reaction of Example 13 for another hour, a total of 1460 grams of toluene and 1.308 gram moles of acetylene had been charged to the reactor and an additional sample of 451.9 grams had been taken off. The added acetylene was 16.5% of that theoretically required for the stated total amount of toluene.

Example 15

Continuing the reaction of Example 14 for a third hour, the total charge of toluene was 1899 grams and the total charge of acetylene was 1.915 gram moles, and a 389.4 gram sample of the organic phase was removed. At the end of four hours, a total of 2367 grams of toluene and 2,040 cubic feet (2.57 gram moles) of acetylene had been charged, and an additional 254.7 grams of organic material had been discharged from the reactor. The total of added acetylene was 20% of that theoretically required to react with all the toluene which had been charged (including the initial charge). Upon combining the samples from the second, third, and fourth hours and distilling a 753.2 gram portion through a fractionating column, 196 grams of 1,1-ditolylethane boiling at 123 to 129° at 2–3 mm. Hg, $n_D^{25}=1.5624$ was obtained, and 526.5 grams of toluene was recovered. The residue in the still pot was 14.8 grams, which amounts to 7% of the product and residue. Thus, the distillation indicates that about 93% of the reacted toluene was converted to 1,1-ditolylethane. Calculations from estimates of the amounts of ditolylethane and toluene recoverable from the reactor and samples indicated a ditolylethane yield of 91.2% of theory based upon the amount of the 2367-gram total toluene charge which was used up. Calculations from the estimated recoverable ditolylethane indicated a yield of 92.9% based on acetylene charged during the 4 hour period.

*Example 16*

Upon continuing the reaction in Example 15 an additional four hours, a total of 3650 grams toluene and 5.502 gram moles of acetylene had been charged to the reactor, and a total of 1288 grams of organic material had been recovered from the reactor. Upon distilling a 755 gram portion of the 840 grams of material removed during the 7th and 8th hours (from beginning of acetylene addition), 188.1 grams of 1,1-ditolylethane was obtained, and the distillation left a residue of 14.8 grams. The yield of ditolylethane based on moles of toluene reacted (converted to ditolylethane and higher boiling products) was 87.6% in this reaction in which the total amount of acetylene charged from the beginning of the run was 27.8% of the theoretical amount required to react with the stated total toluene charge.

*Example 17*

The reaction in Example 16 was continued until after a total of 32 hours about 12,710 grams of toluene had been charged and about 25.4% of the theoretical amount of acetylene required to react with the stated amount of toluene had been absorbed in the reaction mixture. During the last 10 to 15 hours of the reaction, much of acetylene gas had been coming off the reaction mixture rather than being absorbed; this was probably due to insufficient catalyst because of plugging in the return line from the separator. Distillation of a 492 gram sample of the reactor contents showed it contained 91.2% toluene, 5.5% 1,1-ditolylethane, and 1.7% bottoms.

*Example 18*

In the reactor of Example 13 were placed 1130 grams of toluene, 900 grams of sulfuric acid, and 8.3 grams of mercuric sulfate, and acetylene was passed into the reactor at the rate of about 0.5 gram mole per hour; additional toluene was also charged to the reactor. During a two-hour period, 1.15 gram moles of acetylene and 200 cc. of toluene were charged, and a 182.9 gram sample of product was obtained, which had a refractive index, $n_D^{25}=1.5009$. During this reaction the amount of acetylene charged was about 16.2% of the stoichiometric amount theoretically required to react with all the toluene charged (including the initial charge).

*Example 19*

Upon continuing the reaction of Example 18 an additional two hours, a total of 2.14 gram moles of acetylene and 19.6 gram moles of toluene had been charged to the reactor; a 213.1 gram sample was removed during the third hour (from the start of the reaction), and a 226.7 gram sample in the fourth hour. The third hour sample was of refractive index $n_D^{25.5}=1.5010$, and the fourth hour, $n_D^{25.5}=1.5105$. The amount of acetylene charged during the four hours was approximately 21.8% of that theoretically required to react with all the toluene which had been charged (including the initial charge). Distillation of a portion of the combined samples from the third and fourth hours showed the sample contained 18.4% 1,1-ditolylethane and 1.4% higher boiling products, thus indicating that about 93% of the reaction product was 1,1-ditolylethane. The distilled ditolylethane was of refractive index, $n_D^{25.5}=1.5625$.

*Example 20*

Upon continuing the reaction in Example 19 an additional 8 hours, a total of about 3880 grams of toluene and about 3.53 gram moles of acetylene had been charged; samples of product were collected continuously. Distillation of a fraction of the combined samples from the last three hours showed that 31.1% of the combined samples was 1,1-ditolylethane, while 2.4% was higher boiling product, thus indicating that about 92.8% of the reaction product was 1,1-ditolylethane. The acetylene charged during this reaction was about 26.9% of the theoretically required amount.

*Example 21*

In a duplication of laboratory procedure, the condensation of acetylene with toluene was carried out in a 25-gallon jacketed Hastelloy reactor containing a turbine type agitator. The acetylene was introduced above the surface of the reactants. Toluene, 71.5 pounds and 78.5 pounds of 91.5% sulfuric acid with 0.6 pound mercuric sulfate were charged to the reactor and acetylene was passed in at a rate of 0.45 pound per hour or less. After 8½ hours at −3 to +5° C., the mole ratio of the toluene to the acetylene charged was 5.11. The sulfuric acid was then diluted by addition of ice, and the product layer was washed. The clean, oily, organic layer was composed of 59% toluene and 31% 1,1-ditolylethane. The 22 pounds of 1,1-ditolylethane amounted to a yield of 76.4% based on acetylene charged. Because of the small amount of heat transfer surface in the reactor, it was necessary to add the acetylene at a slow rate, and the addition procedure required 8½ hours; the 76.4% yield is noteworthy in view of the protracted reaction time.

*Example 22*

Additional heat transfer surface was installed in the reactor of Example 21 and 86.0 pounds of toluene and 94.7 pounds of sulfuric acid were charged to the reactor along with about 0.75% mercuric sulfate catalyst (based on the sulfuric acid). Over a 4.3 hour period, 42.1% of the theoretically required acetylene was passed into the reactor at a temperature of about −7° C. The yield of 1,1-ditolylethane product, based upon the acetylene charged, was 83%. In this run, a large portion of the toluene charge was toluene recovered from other ditolylethane preparation procedures; the use of this recovered material did not appear to affect the reaction, except that the initial absorption rate of acetylene was lower.

*Example 23*

In a procedure similar to that of Example 1, a mixture of xylenes containing 68% meta- and 32% ortho-xylene was condensed with acetylene. The run was conducted over about a three-hour period using 800 grams of 90% sulfuric acid containing 6 grams mercuric sulfate as the catalyst. Acetylene, 38.5 grams (1.48 moles), was passed into 1079 grams (10.1 mole) of the xylenes. The yield was 85.2% based on acetylene charged, and 92.3% based on xylenes used up.

*Example 24*

In a run under the conditions of Example 23, 54.5 grams of acetylene was passed into 1063 grams of a mixed xylene (about 1 mole acetylene to 4.76 moles of mixed xylenes). The mixed xylenes charged were analyzed as 3.9% toluene, 22.5% ethylbenzene, 9.3% p-xylene, 40.7% m-xylene, 21.2% o-xylene and 0.2% paraffins. The yield of 1,1-diarylethanes was 75.3% on acetylene charged, and about 85.7% on aryl compounds used up.

The 1,1-diarylethanes produced in accordance with the process of my invention may be catalytically cracked in the vapor phase to yield nuclear substituted styrenes. The process employed to catalytically crack the 1,1-diarylethanes produced may be carried out in accordance with those disclosed in U.S. Patents Nos. 2,373,982; 2,420,688; 2,420,689; 2,422,163; 2,422,164; 2,422,165; 2,422,169; 2,422,171, and 2,422,318.

While the invention has been described herein with particular reference to various preferred embodiments thereof, and examples have been given of suitable proportions and conditions, it will be appreciated that variations from the details given herein can be effected without departing from the invention in its broadest aspects.

I claim:

1. In the process of producing 1,1-dixylylethane wherein acetylene is reacted with xylene in the presence of a sulfuric acid-mercuric sulfate catalyst, the improvement which comprises reacting from about 25% to about 50% of the stoichiometric amount of acetylene required to react with all of the xylene.

2. In the process of producing 1,1-di-o-xylylethane wherein acetylene is reacted with o-xylene in the presence of a sulfuric acid-mercuric sulfate catalyst, the improvement which comprises reacting from about 25% to about 50% of the stoichiometric amount of acetylene required to react with all of the o-xylene.

3. In the process of producing 1,1-di-m-xylylethane wherein acetylene is reacted with m-xylene in the presence of a sulfuric acid-mercuric sulfate catalyst, the improvement which comprises reacting from about 25% to about 50% of the stoichiometric amount of acetylene required to react with all of the m-xylene.

4. In the process of producing 1,1-di-(ethylphenyl)ethane wherein acetylene is reacted with ethylbenzene in the presence of a sulfuric acid-mercuric sulfate catalyst, the improvement which comprises reacting from about 25% to about 50% of the stoichiometric amount of acetylene required to react with all of the ethylbenzene.

5. In the process of producing 1,1-diarylethanes wherein acetylene is reacted with a compound selected from the group consisting of mono- and di-alkyl substituted benzene in the presence of a sulfuric acid-mercuric sulfate catalyst, the improvement which comprises reacting from about 25% to about 50% of the stoichiometric amount of acetylene required to react with all of the compound selected from the group consisting of mono- and di-alkyl substituted benzene.

6. In the process of producing 1,1-ditolylethane wherein acetylene is reacted with toluene in the presence of a sulfuric acid-mercuric sulfate catalyst, the improvement which comprises reacting from about 25% to about 50% of the stoichiometric amount of acetylene required to react with all of the toluene.

7. In the process of producing 1,1-diarylethane wherein acetylene is reacted with a compound selected from the group consisting of mono- and di-alkyl substituted benzene in the presence of a sulfuric acid-mercuric sulfate catalyst, the improvement which comprises reacting in a multi-stage continuous reaction from about 25% to about 50% of the stoichiometric amount of acetylene required to react with all of the compound selected from the group consisting of mono- and di-alkyl substituted benzene, the amount of acetylene introduced into each stage of the reaction being a fraction of the total amount reacted and wherein the number of added fractions is equal to the number of stages in the multi-stage continuous reaction.

8. In the process of producing 1,1-diarylethanes wherein acetylene is reacted with a compound selected from the group consisting of mono- and di-alkyl substituted benzene in the presence of a sulfuric acid-mercuric sulfate catalyst, the improvement which comprises reacting from about 25% to about 50% of the stoichiometric amount of acetylene required to react with all of the compound selected from the group consisting of mono- and di-alkyl substituted benzene and conducting the reaction by passing the reactants and catalyst through a tube, the acetylene being introduced at the start of the tube and at a plurality of points along the path of flow.

9. In the condensation of acetylene with aromatic hydrocarbon to form diarylethane in the presence of a catalyst comprising sulfuric acid containing mercuric ions, the improvement which comprises adding acetylene in a quantity of 1 mole per 4 to 6 moles of aromatic hydrocarbon and intimately admixing by vigorous and rapid agitation.

10. In the condensation of acetylene with aromatic hydrocarbon to form diarylethane in the presence of a catalyst comprising sulfuric acid containing mercuric ions, the improvement which comprises conducting the condensation in a manner to produce turbulent flow effecting thorough dispersion of catalyst with hydrocarbon and adding acetylene in a quantity of 1 mole per 4 to 6 moles of aromatic hydrocarbon.

11. In the condensation of acetylene with aromatic hydrocarbon to form diarylethane in the presence of a catalyst comprising sulfuric acid containing mercuric ions, the improvement which comprises adding acetylene in a quantity of about one-third the stoichiometric amount required to react with all of the aromatic hydrocarbon.

References Cited in the file of this patent

UNITED STATES PATENTS

| 2,439,228 | Sturrock et al. | Apr. 6, 1948 |
| 2,500,369 | McCoubrey et al. | Mar. 14, 1950 |
| 2,734,928 | Smolin | Feb. 14, 1956 |

FOREIGN PATENTS

| 529,045 | Belgium | Nov. 22, 1954 |

OTHER REFERENCES

Reichert et al.: Journal of the American Chemical Society, volume 45 (1923), pages 3090–3091 relied on.

Reilly et al.: Journal of the American Chemical Society, volume 50 (1928), pages 2564–2566 relied on.

Cyanamid (Australia) Abstract of Australian patent application #488/54, published February 22, 1955.